United States Patent Office 3,298,762
Patented Jan. 17, 1967

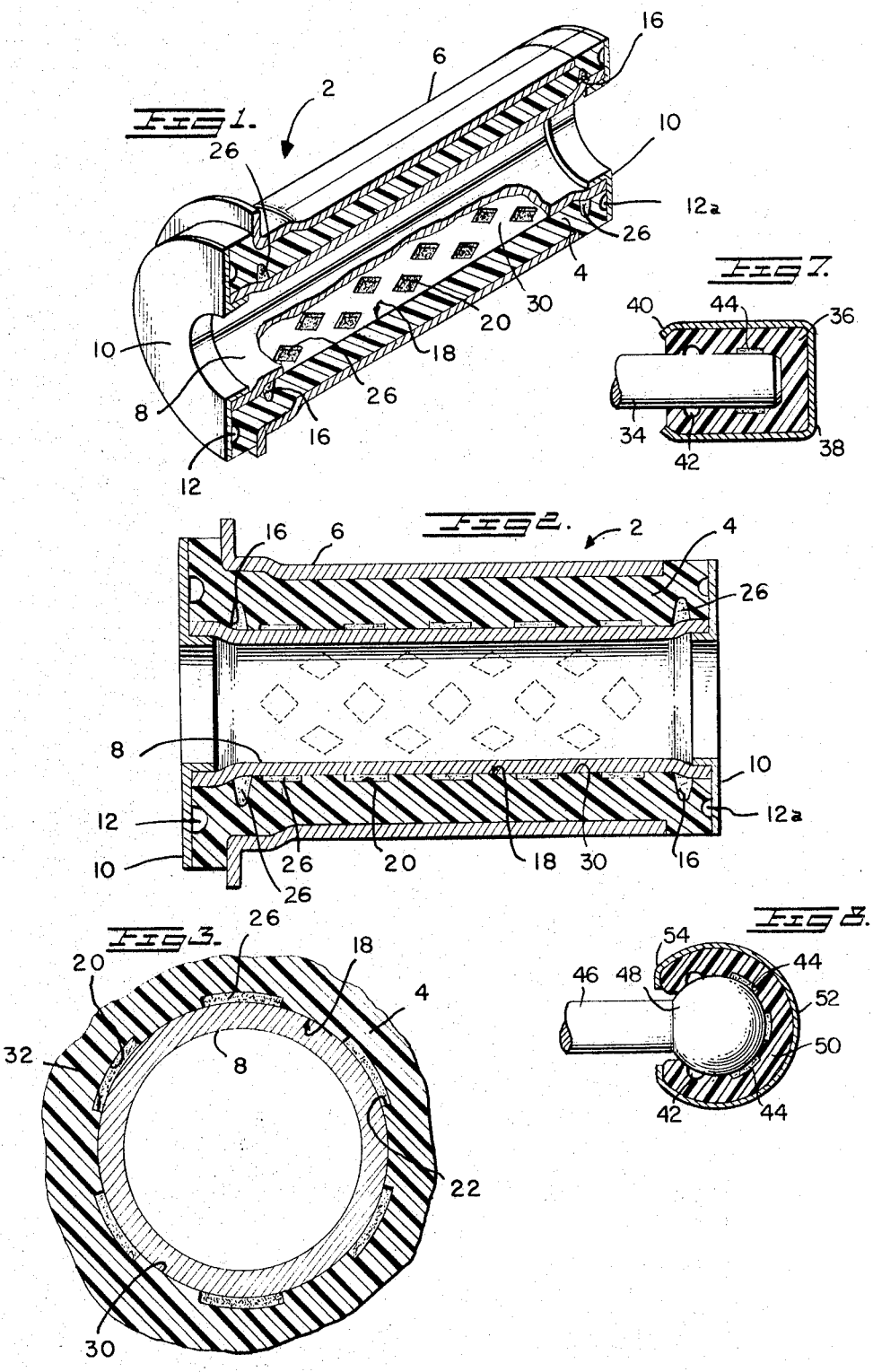

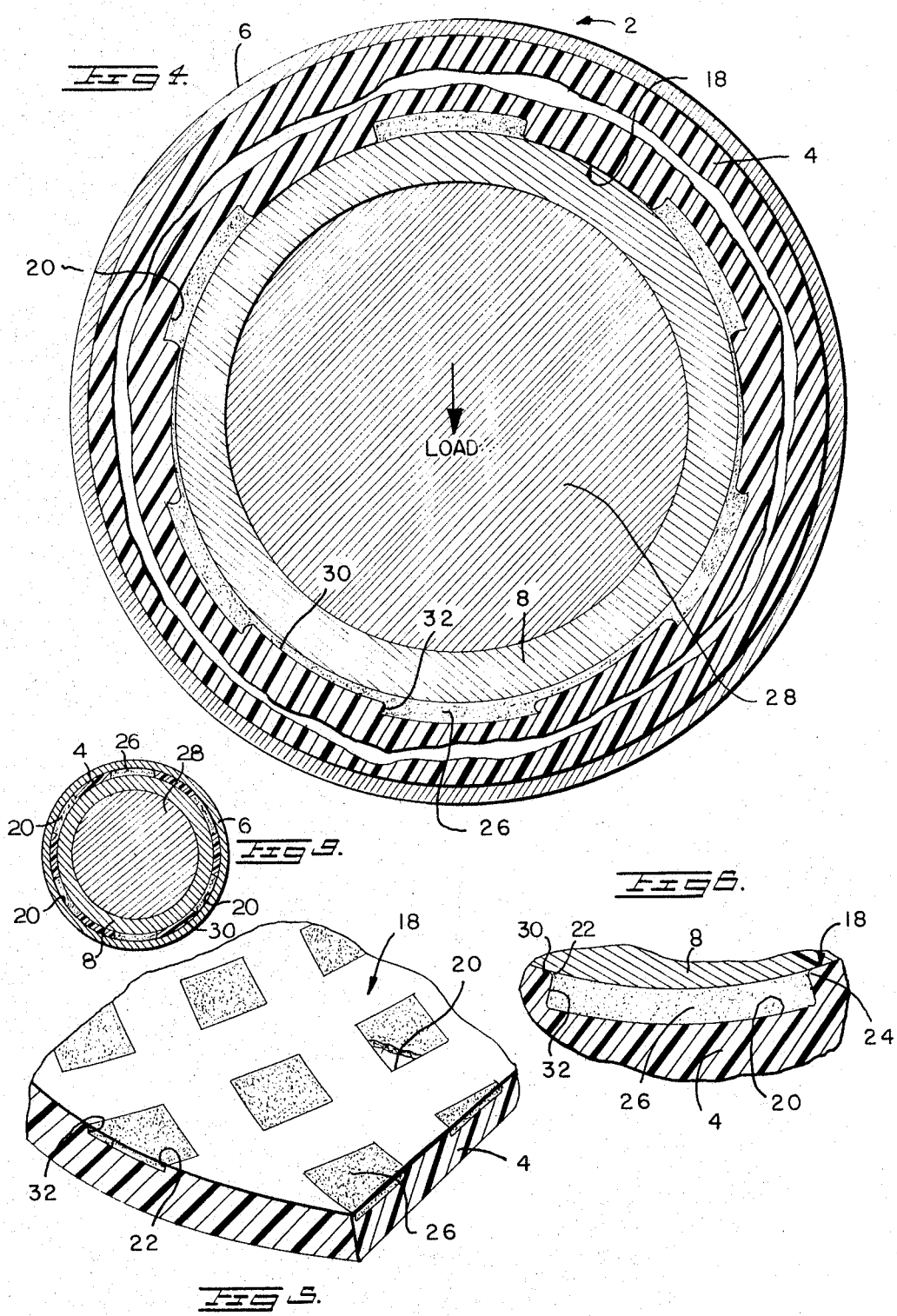

3,298,762
SELF-LUBRICATING JOINT
Richard O. Peck, and Charles O. Slemmons, Akron, Ohio, assignors to The General Tire & Rubber Company, a corporation of Ohio
Filed Dec. 18, 1962, Ser. No. 245,558
12 Claims. (Cl. 308—238)

This invention relates to bushings and more particularly to permanently lubricated bushings especially useful in low torque applications.

The new bushings comprise, in general, an encapsulated resilient organic polymeric material insert having lubricant-filled pockets disposed on its bearing surface having a rotatable movable member supported therein.

Bushings having lubricant transmitting and distributing channels between the sliding surfaces are well known in the art. A disadvantage in this type of bushing structure is that periodic lubrication is required and, if lubrication is omitted through error or oversight, the bushing can be seriously damaged in a relatively short time. Lubrication is especially critical where such bushings are used in connection with motor vehicle steering linkages and other portions of automobiles which are constantly subjected to the effects of deleterious substances such as water, mud and dust.

It is also known to utilize lubricant filled reservoirs on or communicating with the sliding surfaces of self-lubricating bushings and bearings wherein the reservoirs are supplied with lubricant prior to the assembly of the structure and wherein the lubricant is distributed between the sliding surfaces through frictional contact of one of the moving surfaces with the surface of the lubricant disposed in the reservoirs. Such rigid type bushings having pre-lubricated reservoirs suffer a disadvantage in possible depletion of a portion of the lubricant contained in the reservoirs through absorption in the bearing structure, expulsion from the system or evaporation which decreases the effectiveness of lubrication since the lubricant gradually recedes from contact with the moving surfaces as its volume is diminished. Devices of the prior art having attempted to overcome this disadvantage by providing reservoir systems which route the lubricant discharged from the reservoirs by centrifugal force, back to the reservoirs thereby providing a recovery and replenishing circuit for the bushing. A disadvantage here lies in the complexity required to achieve this recirculation and also the necessity of a relatively high rotational speed to accomplish the recirculation effect. This solution is unsuitable in applications where centrifugal forces are negligible, if present at all. A larger number of such applications, i.e., units involving low oscillatory rate operation, exist particularly in the automotive field.

A principal object of this invention is to provide a self-lubricating low torque bushing which overcomes the above-stated disadvantages.

A further object of this invention is to provide an encapsulated, pre-lubricated bushing for low-torque applications which is impervious to the deleterious effects of the environment to which it is subjected.

Another object of this invention is to provide a self-lubricating bushing which is structurally simple and inexpensive to manufacture.

A still further object of this invention is to provide a self-lubricating bushing which will not require replenishment of the lubricant supply for the life of the bushing.

A further object is the provision of self-lubricating bushings having shock and vibration absorbing and shaft alignment compensating capabilities for applications where these factors are critical.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by the construction of self-lubricating bushing as illustrated in the accompanying drawings in which like numerals indicated like elements and wherein:

FIG. 1 is a perspective sectional view partially fragmented of an embodiment of the present invention in perspective;

FIG. 2 is a side sectional view of the embodiment of FIG. 1;

FIG. 3 is an enlarged fragmentary transverse view of the embodiment of FIG. 1 in section, showing a view of the bushing in a no-load condition;

FIG. 4 is a much enlarged fragmentary transverse view of the embodiment of FIG. 1, in section to show the bushing in a loaded condition, the deformation of the elastomeric member of the structure being exaggerated for purposes of illustration;

FIG. 5 is an enlarged, fragmentary, sectional perspective view of the elastomeric member of the invention;

FIG. 6 is an enlarged fragmentary transverse view showing a portion of the elastomeric member in section;

FIG. 7 is a side view of another embodiment of the invention in section;

FIG. 8 is a side view of still another embodiment of the invention in section; and FIG. 9 is an end view in section of the embodiment of FIG. 1 incorporating a reduced thickness elastomeric member.

Referring now to FIG. 1, an embodiment of the invention is shown as sleeve bushing 2 of the type used in motor vehicle idler arm connections. Resilient elastomeric member 4 is encased in outer shell member 6 and has inner shell member 8 disposed through the bore thereof. End ferrules 10 abut the ends of sleeve member 4 and are connected to the ends of inner shell 8 by a press or interference fit therewith.

Member 4 is made of resilient organic polymeric material unreactive with and resistant to the lubricant used in the bushing. Examples of such materials are diolefin polymers such as natural rubber, synthetic rubbers, including butadiene-acrylonitrile copolymers, butadiene-styrene copolymers, polychloroprene and other elastomeric materials such as polyurethanes as well as plastics such as polypropylene or the like. The desirable properties of the organic polymeric material are high modulus, low friction, high tensile strength, high elongation, and resistance to the type of lubrication to be used in the bushing. The insert material is advantageously formed of the class of materials generally referred to in the art as elastomers. It should be more resilient and of less hardness than the metal which encapsulates it. It has been found that specially compounded polyurethane rubbers such as those disclosed in copending applications Serial No. 242,813 filed December 6, 1962 to Edwin M. Maxey will provide particularly long service life for the bushing. Patent No. 2,881,995, April 14, 1959, to Neher, discloses examples of other polyurethane compounds which can be used for the elastomeric member of the present invention.

Bushings constructed in accordance with the invention have been tested according to one manufacturer's specification to a life of 5,000,000 cycles where heretofore a stringent requirement for such a bushing has been 300,000 cycles.

Member 4 as shown in the assembled condition of FIGS. 1 and 2 is prestressed, or to use a term common in the art—preloaded; that is, it is subjected to forces by virtue of the encapsulation operation.

The resilient member 4 is subjected to two principal forces. One is the radial compression generated by insertion of the member 4, which has a larger outside diameter than the inside diameter of outer sleeve 6, into outer sleeve 6. The second principal force is the axial compression on the ends of member 4 generated by the placing of the end ferrules 10 on the bushing. There also may be a third force present, a radial compression resulting from the insertion of the inner sleeve 8 into the hollow core of member 4.

The primary purpose of putting the outer diameter of resilient member under compression is to prevent any slipping between the resilient bushing member 4 and outer sleeve 6. This can be accomplished by a relatively small force. Advantageously, the degree of compression will be in the range of 2 to 4% but may, depending upon the particular application, vary from about 0.01% to as great as about 10%.

The axial compression helps effect the end seal of the bushing structure. In the embodiment of FIG. 1, the amount of compression of member 4 is approximately 2% in an endwise direction and in most commercial applications varies from slightly less than from 2% to as high as 4%. In special applications an even wider range from about 0.01% to about 10% may be advantageously used.

The third component which may on occasion be present is a radical compression resulting from the insertion of the sleeve 8 into the core of the resilient member 4. In most applications it is advantageous to keep this to a minimum; that is, it should approach zero. There may, however, be occasions when it will be advantageous to impart to this fit a degree of interfacial frictional drag, the degree of which would be determined by the particular requirements of the specific application.

Annular end grooves 12 and 12a are provided in the end faces of resilient member 4. Annular inner grooves 16 are disposed on the inner bearing surface 18 of member 4 near either end thereof. These grooves, in cooperation with inner shell 8 and end ferrules 10, provide effective sealing of the bushing as will be described below.

A symmetrical pattern of pockets 20 is disposed in bearing surface 18 of member 4. In the embodiment illustrated in the drawings, these pockets have a square shape diagonally oriented with respect to the rotational axis of the bushing. The square shape is shown only for illustrative purposes and the pockets could have a circular, triangular, rectangular, or other shape without affecting the operation of the bushing.

Insofar as the size and spacing of the pockets is concerned, it has been found that between 40 and 90 percent contact of the elastomer of member 4 with inner shell 8 is desirable and the best results are generally realized in the range of 50 to 80 percent.

Advantageously, the pockets are spaced one from the other a distance which is determined by the end use of the bushing, or more specificially the angular distance through which the inner member of the bushing assembly will rotate. The inner member or shaft should sweep or oscillate, in order to obtain complete lubrication, a distance that is at least equal to one-half the distance between corresponding portions of adjacent pockets which are on the same circumference of the shaft. From the point of view of practical operation, a degree of oscillation of somewhat less than this can be tolerated because of a mixing action which the grease undergoes.

The pockets are independent of each other so that flow of lubricant from one pocket to the other is prevented, i.e., the pockets are separate. If they are not, the bearing assembly will, after a rather limited degree of use, tend to force all or most of the lubricant to a portion of the assembly which will become relatively rich in lubricant to the detriment of the highly stressed portions of the bearing which will become relatively poor in lubricant, and this will result in a shortening of the operative life of the bushing to an unwarranted degree.

The inter-relationship between the form of the pockets and the percentages of elastomeric material in contact with the inner shell 8 is also important. Thus, the inner shell contacting structures should have suitable cross-sectional area with respect to their height from the bottom of the pockets to provide a stable structure. The size of pockets 20 is also dictated by the life requirements of the bushing. The resulting volume of the recesses must be great enough to provide a supply of lubricant over the required life of the bushing. Generally, within the limits outlined above, increasing the size of the pockets increases the potential life of the bushing. The relative size and spacing of the pockets 20 shown in the illustrated embodiment satisfies the above requirements. The pockets are disposed in parallel staggered rows over the inner surface of the member 4 and are spaced from one another a distance approximately equal to the width of the pocket. The pockets are, in addition, rectangular in elevation and have a depth equal to one-fourth of the width of the pocket. The edges of the pockets 22 at the intersection with bore surface 18 are formed with a small radius 24 (see FIG. 6) for purposes to be described below.

Pockets 20 and inner grooves 16 are filled with lubricant 26 at the time of assembly of the bushing. Although any fluid lubricant not detrimental to the elastomeric material used in the bushing, would be suitable for use, high viscosity liquid or semisolid lubricants have been found to be more desirable than liquids having a lower viscosity. It has been found advantageous to use high molecular weight silicone greases. The type of lubricant also is determinative of the size of the pockets 20 in that a smaller volume of lubricant is required when a longer life lubricant is used since it requires more time to break down and lose its effectiveness.

For purposes of illustration and as an example of the design of a bushing insert, particularly of the configuration and spacing of the land areas between pockets in the elastomeric material, the following is included:

As with all elastomeric materials, one of the more important parameters to be considered is the compression-deflection characteristics of the design. The compressive stress is the load per unit area in contact while deflection is the deformation caused by the compressive load and is usually expressed in terms of percent of original thickness. In order to calculate these characteristics, it is essential that the shape factor be known. This latter quantity is defined as the ratio of loaded area to free area with free area being that portion of the insert which is free to bulge or expand during compression-deflection.

If plots of compressive stress versus percent deflection are drawn for a related range of shape factors, the resulting family of curves would make evident:
(1) That the lower shape factor curves have a less steep slope which means a lower spring rate and
(2) The maximum allowable compressive stress increases as the shape factor increases.

These relationships hold for any elastomeric material used for a bushing insert, although the exact position of the curves would vary with material. Such a plot may be determined for any material used.

In bushings of the type contemplated, the sides of the lubricant pockets constitute the above-mentioned free area while the lands of the patttern constitute the loaded area. The bottoms of the lubricant pockets have a negligible effect on the calculation of the shape factor and this bottom area in most cases may be ignored in calculations of the shape factor.

In summary, then a particular pattern is chosen empirically. The chosen design should first meet the previously-discussed criteria of having a lubricant containing pocket pass over all areas of the insert during operation and further should be one wherein the maximum recommended compressive stress is not exceeded. Whether the maximum compressive strength is or is not exceeded is ascertained by determining the shape factor for the chosen design and then referring to a previously-determined family of curves wherein the compressive stress is plotted against the percent deflection. This comparison will show whether the compressive stress for the design chosen is acceptable in that it is less than the maximum recommended compressive stress for the shape factor.

As a specific example of an embodiment of the invention, a bushing suitably incorporating the features of this invention would be of the configuration of FIG. 1 and have the following dimensions:

| | Inches |
|---|---|
| Outside diameter of shell 6 | 1⅛ |
| Inside diameter of shell 8 | ½ |
| Length of shell 6 | 1.88 |
| Overall length of bushing 2 | 2¼ |

The elastomeric member 4 in a relaxed unassembled condition has the following dimensions:

| | Inches |
|---|---|
| Outside diameter at midsection | 1 |
| Thickness at midsection | ⅛ |
| Overall length | 2 5/16 |
| Cross-sectional radius of groove 12 | 3/64 |
| Cross-sectional radius of groove 12a | 1/32 |
| Cross-sectional radius of grooves 16 | 3/64 |
| Width of pockets 20 | ⅛ |
| Length of pockets 20 | ⅛ |
| Spacing of pockets 20, corner to corner | ⅛ |
| Depth of pockets 20 | 1/32 |

The bushing is incorporated into the idler arm system by pressing it into the bore of the idler arm, with outer shell 6 making an interference fit with the inner surface of the idler arm bore. A bolt connected by bracket or other suitable means to the frame of a motor vehicle, is inserted through inner shell 8 and end ferrules 10 and torques thereto by a nut threaded on the end of the bolt.

Referring now to FIG. 4, the operation of the self-lubricating mechanism is shown with restraining means, in this case bolt 28, disposed in the bushing assembly. Resilient member 4 is shown in exaggerated deformation caused by a load applied to the bushing assembly through the bolt in a direction shown by the arrow. Member 4 and the associated lubricant are essentially encapsulated by end ferrules 10 and outer shell 6 so the load is applied to what amounts to an essentially dual component incompressible system which will deform but not be decreased in total volume. Since deformation of member 4 will be greatest at the point in line with the direction of the loading and will decrease proportionally to a minimum at 180° from the direction of loading, member 4 assumes a configuration shown in exaggeration in FIG. 4. Deformation of member 4 causes lower lands 30 between pockets 20 to be compressed thereby decreasing the volume of the pockets. These lands, as discussed previously, are designed so as to deform in compression rather than buckling thereby causing the sides 32 of the pocket to bulge inwardly resulting in a further decrease in the volume of pockets 20. Since both the lubricant 26 and the elastomeric material of member 4 are substantially incompressible, the lubricant is forced from the pockets between inner shell 8 and lands 30 thereby lubricating the sliding surfaces of the bushing. When the load is removed from the bushing, member 4 returns to the unloaded configuration of FIG. 3 and lubricant 26 returns to pockets 20. The resulting system thereby provides an encapsulated, self-lubricating bushing, having lubricant storing pockets in which the lubricant is displaced from and returned to the pockets through the cyclical loading of the bushing, an action which is independent of rotation of the bearing members or the degree thereof.

Radii 24 facilitate the spreading of the lubricant as it is ejected from pockets 20. Inner grooves 16 are also filled with lubricant 26 to provide lubrication for the end most bearing surfaces of inner shell and member 4. This operation, which might be likened to a pumping action results in and of itself in the lubrication of all areas adjacent the pockets.

An additional lubricating action results from the rotational movement or oscillation of the inner shell 8 in contact with or at the interface with resilient member 4. Thus, the lubricant immediately adjacent inner shell 8, as well as that expelled from pockets 20, is spread or swiped over the interface.

To summarize then, the bushing of the present invention improves over those of the prior art in that two mechanisms combine to give maximum lubrication during operation. These actions are the pumping action and the swiping action. Because of the new bearing structure, these two forces may continue to function as described during the entire life of the bearing.

End grooves 12 and 12a may be also provided with lubricant in order that the interface between ferrule 10 and the end portion of resilient member 4 be lubricated. In large assemblies a multiplicity of end grooves may be used or if desired the pattern of member 4 may be extended to the ends in order to obtain the required degree of lubrication. If the pattern is extended to the end, it will not function in the same way because the difference in loading during use precludes to a great degree the pumping action described above. In addition, these grooves provide some space for the expansion of the elastomeric material of member 4 and to some extent the lubricant when the bushing is under load, thereby preventing pumping of critical quantities of lubricant from the ends of the bushing. When the assembly is first put into operation, it may carry a greater amount of lubricant than is needed in operation which will pump out of the bushing during use. This pumping will displace the excess lubricant and permits the grooves 16 to act as reservoirs for the pockets 20 thereby increasing to the maximum degree lubricant retention.

The invention has been described particularly as it applies to idler arm type bushings used in motor vehicles. It should be appreciated that the principles of the invention are applicable to any relatively oscillating or rotating mechanism in motor vehicles or otherwise. Other types of structure could be substituted for the sleeves and ferrules described in the embodiment of the drawing.

Resilient member 4 could also be formed otherwise than as shown in FIGS. 1 through 8 as long as resilient reservoirs for the lubricant are provided as described.

Referring to FIG. 9, such a variation is shown. The sleeve member has been reduced to a thickness equalling the depth of pockets 20. The resulting resilient structure consists of a network formed by lands 30 and the inner surface of outer shell 6 forms the bottom of the pockets 20. Resilient member 4 and shell 6 could be without positive connection or the two may be bonded together at their mating surfaces by suitable means.

The principles of the invention are also applicable to bushings other than the cylindrical type shown in FIGS. 1 through 5, for example, ball and socket joints, rod and socket joints, or the like.

Referring now to FIGS. 7 and 8 of the drawings, embodiments of the invention of the rod and socket and ball and socket type respectively are shown. Rod 34 is shown slidably disposed in cup-shaped resilient member 36. Cup-shaped outer shell 38 compressively contains the resilient member as in the embodiment of FIG. 1. Reduced portion 40 is formed by suitable means at the mouth of outer shell member 38 and serves to provide concentrated compression for resilient member 36, thereby providing a seal for the bushing. Annular groove 42 is disposed around the inner surface of the mouth of resilient member 36 and serves to aid in the sealing of the bushing in a similar manner to that of grooves 12 and 12a in the embodiment of FIG. 1. Elastomeric member 36 also has lubricant filled pockets 44 disposed around the inner periphery thereof in a similar fashion to that of FIG. 1.

Referring now specifically to FIG. 8, rod member 46 is shown with a spherical ball 48 disposed on the end thereof. The ball is slidably disposed in arcuate resilient member 50 which is in turn compressively contained in arcuate outer shell 52. Reduced portion 54 is provided by suitable means at the mouth of the shell member 52. As in the embodiment of FIG. 7, annular groove 42 is provided around the inner mouth of resilient member 50 and lubricant-filled pockets 44 are provided on the inner surface of the resilient member.

It is, therefore, to be understood that, within the scope of the appended claims, the invention may be practiced otherwise than specifically described.

What is claimed as new and desired to be secured by Letters Patent of the United States is:

1. A self-lubricating articulate joint comprising a pair of concentrically disposed and relatively rotatable members, said members defining an annular space therebetween, a resilient member of organic polymeric material occupying said space, the outer member of said pair of members substantially encapsulating and compressively constraining said resilient member therein, said resilient member having a plurality of separate pockets in a rotatable member abutting surface thereof said pockets having sides, each of which are substantially perpendicular to the rotatable member abutting surface of said resilient member, fluid lubricant material filling said pockets, said pockets being spaced laterally and transversely to provide a sufficient area of said abutting surface between said pockets to insure compressive nonbuckling yielding of said abutting surface when said joint is subjected to radial loading, whereby radial loading of said joint causes compressive yielding of said abutting surfaces thereby decreasing the volume of said pockets and causing a portion of the lubricant material therein to be ejected therefrom to provide lubrication of said abutting surfaces.

2. A self-lubricating articulate joint comprising a pair of concentrically disposed and relatively rotatable members, said members defining an annular space therebetween, a resilient member of organic polymeric material occupying said space, means associated with the end of said resilient member to compressively constrain said resilient member in a longitudinal direction, the outer member of said pair of members compressively constraining said resilient member in a radial direction, said outer member and said means substantially encapsulating said resilient member therein, said resilient member further having a plurality of separate pockets on a journal bearing surface thereof, said pockets having sides, each of which are substantially perpendicular to the journal bearing surface of said resilient member, incompressible lubricant material filling said pockets, said pockets being spaced laterally and transversely to provide sufficient area of said abutting surface between said pockets to insure compressive nonbuckling yielding of said abutting surface when said joint is subjected to radial loading, whereby radial loading of said joint causes compressive yielding of said abutting surface thereby decreasing the volume of a portion of said pockets and causing a portion of the lubricant material therein to be ejected therefrom to provide lubrication of said abutting surfaces.

3. A joint in accordance with claim 2 wherein said relatively rotatable members comprise inner and outer tubular open ended sleeves, said resilient member defining a tubular shell having transverse end surfaces at either end thereof, said means comprising annular transversely extending ferrules coaxially disposed at each end of said inner member, said ferrules slidably abutting the end surfaces of said resilient member, said end surfaces further having coaxially disposed annular grooves thereon, said rotatable member abutting surface having annular grooves thereon adjacent to said end surfaces and coaxially disposed in relation to said resilient member, and lubricant material filling said grooves.

4. A joint in accordance with claim 2, wherein said relatively rotatable members comprise respectively a cylindrical blunt-ended shaft and a cup-like sleeve having one open end, said sleeve disposed over one end of said shaft, said resilient member comprising a cup-like insert having one open end, said means comprising a reduced portion at the open end of said sleeve, said reduced portion compressively constraining said resilient member, said rotatable member abutting surface having an annular groove concentrically disposed thereon adjacent to the open end of said insert.

5. A joint in accordance with claim 2, wherein said relatively rotatable members comprise respectively a shaft having a ball on the end thereof and a hollow socket around said ball, said resilient member comprising a hollow spherical insert having an opening therein, said means comprising a reduced portion at the mouth of said socket compressively constraining said resilient member, said rotatable member abutting surface having an annular groove concentrically disposed thereon and adjacent to the opening in said insert.

6. A self-lubricating articulate joint capable of long-term articulating operation without failure and need for addition of externally applied lubrication comprising a first rigid member, a second rigid member disposed concentrically to said first member, said first and second members being relatively rotatable with respect to one another, said first member having an arcuate surface thereon facing said second member, said second member having a complementary arcuate surface thereon facing said first member, said arcuate surfaces defining an annular space therebetween, an elastomeric member occupying said annular space, said elastomeric member having one surface fixed coextensive with said first rigid member surface and the second surface complementary to and slidably abutting said second rigid member surface, the outer of said rigid members substantially encapsulating and compressively constraining said elastomeric member therein, a plurality of pockets formed in said second surface, said pockets having sides, each of which are substantially perpendicular to said second surface and a bottom that parallels said surface, said pockets being spaced laterally and transversely to provide sufficient area of said second surface between said pockets to provide compressive nonbuckling yielding of said second surface when said joint is subjected to radial loading, and incompressible lubricant material filling said pockets, whereby radial loading of said joint causes compressive yielding of said second surface thereby decreasing the volume of a portion of said pockets causing a portion of the lubricant material therein to be ejected therefrom to lubricate said second surface.

7. A self-lubricating articulate joint capable of long-term articulating operation without failure and need for externally applied lubrication comprising a first rigid member, a second rigid member disposed concentrically to said first member, said first and second members being relatively rotatable with respect to one another, said first member having an arcuate surface thereon facing said second member, said second member having a complementary arcuate surface thereon facing said first member, said arcuate surfaces defining an annular space therebetween, an elastomeric member occupying said annular space, said elastomeric member having one surface fixed coextensive with said first rigid member surface and the second surface complementary to and slidably abutting said second rigid member surface, the outer of said rigid members substantially encapsulating and compressively constraining said elastomeric member therein, a plurality of pockets formed in said second surface, said pockets having sides, each of which are substantially perpendicular to said second surface and a bottom that parallels said surface, said pockets being spaced laterally and transversely to provide sufficient area of said second surface between said pockets to provide compressive nonbuckling yielding of said second surface when said joint is subjected to radial loading, and fluid lubricant material filling said pockets, whereby radial loading of said joint causes compressive yielding of said second surface, thereby decreasing the volume of a portion of said pockets causing a portion of the lubricant material therein to be ejected therefrom to lubricate said second surface, and means associated with the end of said joint to retain said lubricant material between the slidably abutting surfaces thereof.

8. A joint in accordance with claim 7, wherein said means comprises transversely extending ferrules connected to said second member, said ferrules slidably abutting the ends of said elastomeric member, the ends of said elastomeric member having an annular coaxially disposed groove thereon, said second surface also having an annular coaxially disposed groove thereon adjacent to the end of said elastomeric member, and a lubricant material filling said second surface grooves.

9. A self-lubricating bushing comprising a tubular elastomeric member, a substantially cylindrical shell member disposed around said elastomeric member in constraining relationship thereto, said resilient member having a plurality of independent pockets symmetrically distributed on the inner surface thereof, said pockets having sides, each of which are substantially perpendicular to said inner surface and a bottom that parallels said inner surface, said pockets being spaced laterally and transversely to provide a sufficient area of said inner surface between said pockets to insure compressive nonbuckling yielding of said inner surface when said tubular elastomeric member is subjected to radial loading, incompressible lubricant material filling said pockets, a tubular inner member disposed through the bore of said resilient member in rotationally slidable relationship therewith, and annular disc-like ferrules fixed to the ends of said inner member in slidable constraining relationship with the ends of said elastomeric member, said shell member in cooperation with said tubular inner member and said ferrules substantially encapsulating said elastomeric member to provide a sealed lubricated bushing, whereby radial loading of said bushing causes compressive yielding of said elastomeric member thereby decreasing the volume of a portion of said pockets and causing a portion of the lubricant material therein to be ejected therefrom, said ejected portion of the lubricant providing lubrication between said elastomeric member and said inner member.

10. A bushing in accordance with claim 9 wherein said pockets are disposed to provide between 40 and 90% of the inner surface of said elastomeric member in contact with said tubular inner member.

11. In a self-lubricating articulate joint having two coaxially disposed and relatively rotatable spaced members, an elastomeric member occupying the space between said rotatable members, said rotatable members substantially encapsulating and constraining said elastomeric member therebetween, a plurality of pockets on a rotatable member abutting surface of said elastomeric member, said pockets having sides, each of which are substantially perpendicular to said rotatable member abutting surface and a bottom that parallels said rotatable member abutting surface, said pockets being spaced laterally and transversely to provide sufficient area of said surface between said pockets to result in compressive nonbuckling yielding of said surface when said elastomeric member is subjected to loading, and incompressible lubricant material filling said pockets, whereby loading of said elastomeric member causes compressive yielding of said surface thereby decreasing the volume of a portion of said pockets causing a portion of the lubricant material therein to be ejected therefrom to lubricate said surface.

12. An elastomeric insert for a self-lubricating bushing comprising a tubular shell having two open ends, a plurality of pockets disposed on the inner surface of said insert, said pockets having sides, each of which are substantially perpendicular to said inner surface and a bottom that parallels said inner surface, said pockets being spaced laterally and transversely to provide compressive nonbuckling yielding of said inner surface between said pockets when said insert is subjected to radial loading, said inner surface further having annular grooves coaxially disposed therein adjacent to the ends thereof, enlarged transversely extending rim portions at the open ends of said insert, said rim portions having lubricating means disposed on the transverse surface thereof.

References Cited by the Examiner

UNITED STATES PATENTS

| 1,184,406 | 5/1916 | Bache | 308—240 |
| 2,980,473 | 4/1961 | Tanis | 308—240 |
| 2,981,573 | 4/1961 | Reuter | 308—36.1 |
| 3,009,746 | 11/1961 | Haushalter | 308—26 |
| 3,097,893 | 7/1963 | White | 308—26 |
| 3,133,769 | 5/1964 | Drake | 308—36.1 |
| 3,157,444 | 11/1964 | Scheel | 308—238 |

FOREIGN PATENTS

| 229,080 | 7/1960 | Australia. |
| 728,474 | 7/1932 | France. |
| 1,120,011 | 6/1956 | France. |
| 177,370 | 3/1922 | Great Britain. |
| 884,170 | 12/1961 | Great Britain. |

MARTIN P. SCHWADRON, *Primary Examiner.*

ROBERT C. RIORDON, DAVID J. WILLIAMOWSKY,
*Examiners.*

D. C. CHAMPION, R. HESS, *Assistant Examiners.*